(12) United States Patent
Fujikawa et al.

(10) Patent No.: US 7,361,624 B2
(45) Date of Patent: Apr. 22, 2008

(54) CATALYST FOR HYDROTREATING GAS OIL, PROCESS FOR PRODUCING THE SAME, AND METHOD FOR HYDROTREATING GAS OIL

(75) Inventors: Takashi Fujikawa, Satte (JP); Takayuki Osaki, Satte (JP); Hiroshi Kimura, Minato-ku (JP); Hirofumi Mizuguchi, Satte (JP); Minoru Hashimoto, Satte (JP); Hiroyasu Tagami, Toshima-ku (JP); Masahiro Kato, Satte (JP)

(73) Assignee: Cosmo Oil Co., Ltd., Tokyo (JP)

( * ) Notice: Subject to any disclaimer, the term of this patent is extended or adjusted under 35 U.S.C. 154(b) by 538 days.

(21) Appl. No.: 10/344,317

(22) PCT Filed: Jun. 19, 2002

(86) PCT No.: PCT/JP02/06116

§ 371 (c)(1),
(2), (4) Date: Feb. 11, 2003

(87) PCT Pub. No.: WO03/000410

PCT Pub. Date: Jan. 3, 2003

(65) Prior Publication Data

US 2003/0173256 A1    Sep. 18, 2003

(30) Foreign Application Priority Data

Jun. 20, 2001 (JP) ............................ 2001-186505
Feb. 7, 2002 (JP) ............................ 2002-031408
Apr. 16, 2002 (JP) ............................ 2002-113109

(51) Int. Cl.
*B01J 31/00* (2006.01)
*B01J 21/18* (2006.01)
*C10G 45/04* (2006.01)

(52) U.S. Cl. .................. 502/170; 502/180; 502/182; 208/217

(58) Field of Classification Search ................ 502/182, 502/180, 170; 208/216 R, 217, 254 H, 216 PP
See application file for complete search history.

(56) References Cited

U.S. PATENT DOCUMENTS

| | | | |
|---|---|---|---|
| 4,176,049 A | * 11/1979 | Winter et al. | ................. 208/70 |
| 4,478,954 A | * 10/1984 | Connolly et al. | ............ 518/700 |
| 5,037,791 A | * 8/1991 | Comolli et al. | ............. 502/185 |
| 5,232,888 A | 8/1993 | Kamo | |
| 5,468,709 A | 11/1995 | Yamaguchi et al. | |
| 5,837,640 A | * 11/1998 | Sudhakar et al. | ........... 502/185 |
| 5,928,499 A | * 7/1999 | Sherwood et al. | ........ 208/216 P |
| 6,559,092 B1 | * 5/2003 | Dufresne et al. | ............ 502/180 |

FOREIGN PATENT DOCUMENTS

| | | |
|---|---|---|
| JP | 2-14745 | 1/1990 |
| JP | 4-156948 | 5/1992 |
| JP | 6-226108 | 8/1994 |
| JP | 6-339635 | 12/1994 |
| JP | 2000-470 | 1/2000 |
| JP | 2000-79343 | 3/2000 |
| JP | 2000-313890 A | 11/2000 |
| JP | 2001-62301 A | 3/2001 |
| WO | 00-62924 | 10/2000 |
| WO | 01-02091 A1 | 1/2001 |

OTHER PUBLICATIONS

Morphology Study of MoS2- and WS2- Based Hydrotreating Catalysts by High-Resolution Electron Microscopy, Payen E., Hubaut R., Kasztelan S., Poulet O. and Grimblot J; Journal of Catalysis, vol. 147, Issue 1, May 1994, pp. 123-132.*

Crystallite Size Determination of Highly Dispersed Unsupported MoS2 Catalysts, Christophe Calais, Nobuyuki Matsubayashi, Christophe Geantet, Yuji Yoshimura, Hiromichi Shimada, Akio Nishijima, Michel Lacroix, and Michele Breysse; Journal of Catalysis 174, 13.*

Characterization and Hydrodesulfurization Activity of W-Based Catalysts Supported on Al2O3-TiO2 Mixed Oxides, J. Ramirez and A. Guttierez-Alejandre; Journal of Catalysis 170, 108-122 (1997).*

International Search Report for PCT/JP02/06116, dated Sep. 3, 2002.

Chinese Office Action dated Mar. 18, 2005.

* cited by examiner

*Primary Examiner*—Glenn Caldarola
*Assistant Examiner*—John Douglas
(74) *Attorney, Agent, or Firm*—Sughrue Mion, PLLC (57) ABSTRACT

A catalyst for hydrotreating gas oil, which comprises an inorganic oxide support having provided thereon: at least one selected from metals in the Group 6 of the periodic table at from 10 to 30% by weight, at least one selected from metals in the Group 8 of the periodic table at from 1 to 15% by weight, phosphorus at from 1.5 to 6% by weight, and carbon at from 2 to 14% by weight, each in terms of a respective oxide amount based on the catalyst, wherein the catalyst has a specific surface area of from 220 to 300 $m^2/g$, a pore volume of from 0.35 to 0.6 ml/g, and an average pore diameter of about from 65 to 95 Å; a process for producing the catalyst; and a method for hydrotreating gas oil, which comprises subjecting a gas oil fraction to a catalytic reaction in the presence of the catalyst under conditions at a hydrogen partial pressure of from 3 to 8 MPa, a temperature of from 300 to 420° C., and a liquid hourly space velocity of from 0.3 to 5 $hr^{-1}$.

16 Claims, 2 Drawing Sheets

CATALYST FOR HYDROTREATING GAS OIL, PROCESS FOR PRODUCING THE SAME, AND METHOD FOR HYDROTREATING GAS OIL

FIELD OF THE INVENTION

The present invention relates to a catalyst for hydrotreating gas oil, a process for producing the catalyst, and a method of hydrotreating gas oil with the catalyst. More particularly, the present invention relates to a catalyst having such excellent activity in the hydrotreating of a gas oil that it can reduce sulfur components and nitrogen components contained in the gas oil to a level lower than those attained with this kind of catalysts heretofore in use, and to a process for producing the catalyst, and a method for hydrotreating gas oil with this catalyst.

BACKGROUND ART

Recently, there is a global trend toward stricter quality regulation values for gas oils so as to improve atmospheric environments. In particular, a sulfur reduction in gas oils is desired because there is a fear that the sulfur components contained in gas oils may adversely influence the durability of after-treatment technologies expected to be effective for exhaust control, such as oxidation catalysts, nitrogen oxide ($NO_x$) reduction catalysts, and continuous-regeneration type catalyzed diesel particulate filters for removing particulate matter from diesel exhausts.

Under these circumstances, develop of a technique of ultra-deep desulfurization for removing most of the sulfur components in a gas oil is being focused. A possible technique generally usable for reducing the sulfur components of a gas oil is to use severer operating conditions for hydrodesulfurization with respect to, e.g., reaction temperature and liquid hourly space velocity.

However, use of an elevated reaction temperature results in impregnation of a carbonaceous matter on the catalyst and hence in a rapid decrease in catalytic activity. On the other hand, use of a lowered liquid hourly space velocity results in a reduced purification efficiency although effective in attaining a higher degree of desulfurization, making it necessary to enlarge the scale of the hydrotreater.

Consequently, the best way of attaining the ultra-deep desulfurization of a gas oil without using severer operating conditions is to develop a catalyst having excellent desulfurization activity.

Many investigations are recently being made on various subjects such as the kinds of active metals, methods of active-metal impregnation, improvements of catalyst supports, regulation of catalyst pore structures, and activation methods, and novel catalysts for deep desulfurization developed have been reported.

For example, JP-A-61-114737 discloses a method which comprises impregnating an alumina or silica support with a solution which contains an organic compound having a nitrogen-containing ligand as a complexing agent and further contains an active metal, followed by drying at 200° C. or lower.

Japanese Patent No. 2,900,771 discloses a method which comprises impregnating a γ-alumina support with an impregnating solution obtained by adding diol or ether to a solution containing a compound of a metal in the Group 8 of the periodic table (hereinafter simply referred to as "Group 8 metal"), a compound of a metal in the Group 6 of the periodic table (hereinafter simply referred to as "Group 6 metal"), and phosphoric acid, followed by drying at 200° C. or lower.

Japanese Patent No. 2,832,033 discloses a method which comprises impregnating a support with a solution comprising a compound of a Group 6 metal, a phosphorus component, a compound of a Group 8 metal and citric acid, as in the process of the present invention, followed by burning without drying. JP-A-4-156948 discloses a method which comprises impregnating a support having provided thereon a compound of a Group 6 metal, a phosphorus component and a compound of a Group 8 metal with a solution containing a specific amount of an organic acid, followed by drying at a temperature of 200° C. or lower.

Furthermore, JP-A-4-244238 discloses a method which comprises depositing a solution comprising a compound of a Group 6 metal, a compound of a Group 8 metal, and a phosphoric acid on an oxide support, drying this support at 200° C. or lower to obtain a catalyst, depositing a solution of an organic acid represented by a specific chemical formula on the catalyst, and then drying the catalyst at 200° C. or lower.

On the other hand, proposals have been made also on a process for catalyst production in which impregnation with an organic acid is conducted twice.

For example, JP-A-6-339635 discloses a method which comprises impregnating an oxide support with a solution comprising a compound of a Group 6 metal, a compound of a Group 8 metal, organic acid and phosphoric acid, followed by drying at 200° C. or lower to obtain a catalyst, and further impregnating the catalyst with a solution of organic acid, followed by drying at 200° C. or lower.

JP-A-6-31176 discloses a technique for catalyst production which comprises impregnating an inorganic oxide support with a compound of a Group 8 metal and heteropolyacid of a Group 6 metal, followed by drying.

Moreover, JP-A-1-228552 discloses a process for catalyst production which comprises impregnating an oxide support with a solution comprising molybdenum, tungsten, a compound of a Group 8 metal, mercaptocarboxylic acid and phosphoric acid.

This process is mainly intended to form a coordination compound of the mercaptocarboxylic acid with molybdenum, tungsten, and the Group 8 metal compound and to highly disperse the coordination compound on the catalyst support.

However, in the catalyst produced by the process described above, the molybdenum and tungsten is highly dispersed on the support and, hence, it is difficult to form laminating layers of molybdenum disulfide such as those in the present invention which will be described later. It is presumed that this related-art process yields no Type II sites of a CoMoS phase or NiMoS phase which are especially effective as active sites for desulfurization (i.e., active sites of cobalt or nickel located at the edges of the second and overlying layers of molybdenum disulfide; Type I sites mean the active sites of cobalt or nickel located at the edges of the first layer of molybdenum disulfide, and have lower activity than the Type II sites).

In addition, there is a possibility that when the mercaptocarboxylic acid, which contains sulfur, is present around the Group 8 metal (cobalt or nickel) or form a coordination compound, then the sulfur contained in the acid might give not desulfurization-active sites (CoMoS phase or NiMoS phase) but $Co_9S_8$ or $Ni_3S_2$, which are inactive forms of cobalt and nickel.

The processes for catalyst production described above have drawbacks that some of these necessitate complicated steps and that some of the catalysts obtained are unsuitable for use in the ultra-deep desulfurization of a gas oil, some have a low efficiency in the ultra-deep desulfurization range, and others have a short life. Accordingly, at the present, there is a desire for the development of a technology for obtaining a catalyst which has higher desulfurization activity and a longer life than desulfurization catalysts heretofore in use and with which the ultra-deep desulfurization of a gas oil can be realized by a simple method without using severer operating conditions.

DISCLOSURE OF THE INVENTION

An object of the present invention is to provide a hydrotreating catalyst with which a gas oil can be exceedingly highly desulfurized and simultaneously denitrified in a simple manner without necessitating severe operating conditions, and to provide a process for producing the catalyst.

Another object of the present invention is to provide a method for highly efficiently hydrotreating a gas oil fraction with the catalyst.

The present invention relates to a catalyst for hydrotreating gas oil, which comprises an inorganic oxide support having provided thereon: at least one selected from metals in the Group 6 of the periodic table at from 10 to 30% by weight, at least one selected from metals in the Group 8 of the periodic table at from 1 to 15% by weight, phosphorus at from 1.5 to 6% by weight, and carbon at from 2 to 14% by weight, each in terms of a respective oxide amount based on the catalyst, wherein the catalyst has a specific surface area of from 220 to 300 $m^2/g$, a pore volume of from 0.35 to 0.6 ml/g, and an average pore diameter of about from 65 to 95 Å.

Furthermore, the present invention relates to a process for producing the catalyst, which comprises providing a metal in the Group 6 of the periodic table at from 10 to 30% by weight, a metal in the Group 8 of the periodic table at from 1 to 15% by weight, phosphorus at from 1.5 to 6% by weight, and carbon at from 2 to 14% by weight, each in terms of a respective oxide amount based on the catalyst, onto an inorganic oxide support having a specific surface area of from 270 to 500 $m^2/g$, a pore volume of from 0.55 to 0.9 ml/g, and an average pore diameter of from 60 to 120 Å, using a solution comprising the metal in the Group 8 of the periodic table, the metal in the Group 6 of the periodic table, organic acid, and phosphoric acid, followed by drying at a temperature of 200° C. or lower.

Moreover, the present invention relates to a method for hydrotreating gas oil, which comprises subjecting a gas oil fraction to a catalytic reaction in the presence of the catalyst under conditions at a hydrogen partial pressure of from 3 to 8 MPa, a temperature of from 300 to 420° C., and a liquid hourly space velocity of from 0.3 to 5 $hr^{-1}$.

BRIEF DESCRIPTION OF THE DRAWINGS

FIG. 2 is a graphic presentation showing the results of a catalyst life test for Catalyst D according to the present invention and comparative Catalyst a.

BEST MODE FOR CARRYING OUT THE INVENTION

The present inventors made intensive investigations in order to accomplish those objects. As a result, it has been found that when an inorganic oxide support is impregnated with a solution containing a compound of a Group 6 metal, a compound of a Group 8 metal, organic acid and phosphoric acid to impregnate these components thereon in given amounts and dried at a temperature of 200° C. or lower, then highly active desulfurization sites (e.g., CoMoS phase, NiMoS phase, etc.) can be precisely regulated without yielding inactive forms of cobalt or nickel. As a result, a high-performance desulfurization catalyst can be obtained which facilitates a ultra-deep desulfurization reaction without using severer reaction conditions because the desulfurization reaction and a denitrification reaction proceed efficiently with the catalyst.

The catalyst of the present invention is suitable for hydrotreating a gas oil fraction such as straight-run gas oil, catalytically cracked gas oil, thermally cracked gas oil, hydrotreated gas oil, desulfurized gas oil, vacuum distillation gas oil (VGO) and the like.

Examples of properties of such feedstock oils include a boiling point range of from 150 to 450° C. and a sulfur content of 5% by weight or lower.

The inorganic oxide support used in the catalyst of the present invention may be alumina alone. It is, however, preferred to use a composite oxide containing alumina as the main component in order to further improve desulfurization activity.

Examples of the alumina which can be used include various aluminas such as α-alumina, β-alumina, γ-alumina, δ-alumina, alumina hydrates and the like. However, an alumina which is porous and has a large specific surface area is preferred. In particular, γ-alumina is suitable. Aluminas having a purity of generally about 98% by weight or higher, preferably about 99% by weight or higher, are preferable.

Examples of impurities contained in aluminas include $SO_4^{2-}$, $Cl^-$, $Fe_2O_3$, $Na_2O$ and the like. The lower the content of these impurities, the more preferable the alumina is. The total content of all impurities is preferably 2% by weight or lower, more preferably 1% by weight or lower. The content of each impurity is preferably as follows. The content of $SO_4^{2-}$ is preferably lower than 1.5% by weight, and that of each of $Cl^-$, $Fe_2O_3$ and $Na_2O$ is preferably lower than 0.1% by weight.

An oxide component used as a component of a composite with an alumina is preferably at least one selected from zeolites, boria, silica and zirconia. Use of these oxide components as components of the composite is advantageous in forming laminating layers of molybdenum disulfide.

Among these oxide components, zeolites have an average particle diameter as determined by the Coulter counter method (1 wt % aqueous NaCl solution; aperture, 30 μm; ultrasonic treatment, 3 minutes) of about from 2.5 to 6 μm, preferably about from 3 to 5 μm, and more preferably about from 3 to 4 μm. In the zeolites, the proportion of particles having a particle diameter of 6 μm or smaller is generally about from 70 to 98%, preferably about from 75 to 98%, more preferably about from 80 to 98%, based on all zeolites particles.

Such properties of zeolites are advantageous for precisely regulating the pore diameter so that substances which are difficult to desulfurize can easily diffuse into the pores. For example, when a zeolite having too large an average particle diameter or too high a content of coarse particles is used for preparing a composite oxide support, the alumina hydrate (alumina precursor) and the zeolite show different degrees of shrinkage during heating and calcining due to a difference in water adsorption or crystallinity between the alumina hydrate (alumina precursor) and the zeolite and this tends to give a composite oxide support having relatively large pores, i.e., meso- or macropores. The large pores not only reduce the surface area but also enable metallic components functioning as a catalyst poison to readily diffuse into the pores in such a case that the catalyst is used for the treatment of bottoms. Such large pores hence tend to result in a catalyst deactivation in desulfurization, denitrification, and cracking.

Preferred examples of zeolites suitable for use as components of a composite with an alumina in the present invention include faujasite X-type zeolite, faujasite Y-type zeolite, β zeolite, mordenite zeolite, ZSM-series zeolites (ZSM-4, 5, 8, 11, 12, 20, 21, 23, 34, 35, 38, 46, etc.), MCM-41, MCM-22, MCM-48, SSZ-33, UTD-1, CIT-5, VPI-5, TS-1, TS-2 and the like. Especially preferred are Y-type zeolite, stabilized Y-type zeolite and β zeolite. Furthermore, proton type zeolites are preferred.

As the boria, silica and zirconia can be used ones generally employed as support components of this kind of catalyst.

The zeolites, boria, silica and zirconia may be used alone or in combination of two or more thereof.

The amount of the components to be incorporated is not particularly limited. However, the amount of the components in the composite oxide support is generally about from 0.5 to below 20% by weight per about from higher than 80 to 99.5% by weight of the alumina, preferably about from 0.5 to 15% by weight per about from 85 to 99.5% by weight of the alumina, and more preferably about from 0.5 to 10% by weight per about from 90 to 99.5% by weight of the alumina.

Too small or too large amounts of those components result in difficulties in pore diameter regulation. In addition, too small amounts thereof result in insufficient impartation of Brφnsted acid sites or Lewis acid sites, while too large amounts thereof result in a tendency for Group 6 metals, especially molybdenum, to be less apt to highly disperse.

The inorganic oxide support to be used in the present invention is prepared through calcination which is conducted at about from 580 to 700° C. for about from 1.5 to 3 hours.

The catalyst of the present invention is prepared by merely drying at 200° C. or lower the inorganic oxide support on which active components have been provided, as will be described later. Accordingly, the mechanical properties of the catalyst (e.g., side crushing strength, compacted bulk density, etc.) which will be described later should be obtained by burning the inorganic oxide support. When calcination is conducted at a temperature lower than about 580° C. for a period shorter than about 1.5 hours, sufficient mechanical strength cannot be obtained. Even when calcination is conducted at a high temperature exceeding about 700° C. for a prolonged period exceeding about 3 hours, not only the effects of burning are saturated but also densification may occur to impair properties of the inorganic oxide support, such as specific surface area, pore volume, and average pore diameter.

The specific surface area, pore volume and average pore diameter of the inorganic oxide support should be as follows so as to enable the catalyst to have high activity in the hydrodesulfurization of hydrocarbon oils. The specific surface area of the support is from 270 to 500 $m^2/g$, preferably from 300 to 450 $m^2/g$. The pore volume thereof is from 0.55 to 0.9 ml/g, preferably from 0.65 to 0.8 ml/g. The average pore diameter thereof is from 60 to 120 Å, preferably from 65 to 90 Å.

The reasons for those property ranges are as follows.

The Group 6 metal and Group 8 metal in the impregnating solution each are thought to be present in the form of a complex (the Group 6 metal has coordinated to the phosphoric acid to form heteropolyacid, while the Group 8 metal has coordinated to the organic acid to form an organometallic complex). Accordingly, when the specific surface area of the support is smaller than 270 $m^2/g$, it is difficult to highly disperse each metal in impregnation because of the bulkiness of the complex. As a result, it would be difficult to precisely regulate the formation of the aforementioned active sites (e.g., CoMoS phase, NiMoS phase or the like) in the resulting catalyst through sulfidation.

When the specific surface area of the support is larger than 500 $m^2/g$, the support has an exceedingly small pore diameter and hence gives a catalyst which also has too small a pore diameter. Such a catalyst having too small a pore diameter has reduced desulfurization activity because the diffusion of sulfur compounds into the catalyst pores is insufficient.

When the pore volume of the support is smaller than 0.55 ml/g, the amount of the solvent infiltrating into the pores is too small when a catalyst is prepared by the ordinary impregnation method. Since the solvent amount is thus limited, the compounds of active metals show poor solubility, resulting in impaired metal dispersibility to give a catalyst having poor activity. Although the solubility of the compounds of active metals may be enhanced by adding a large amount of an acid, e.g., nitric acid, the technique is disadvantageous in that the acid, when added in too large an amount, reduces the surface area of the support and this is a major cause of a decrease in desulfurization activity.

When the pore volume of the support is larger than 0.9 ml/g, the support has an exceedingly small specific surface area and the active metals hence show poor dispersibility, resulting in a catalyst having poor desulfurization activity.

When the pore diameter of the support is smaller than 60 Å, the catalyst to be obtained through active metal deposition also has too small a pore diameter. The catalyst having too small a pore diameter has reduced desulfurization activity because the diffusion of sulfur compounds into the catalyst pores is insufficient.

When the pore diameter of the support is larger than 120 Å, the support gives a catalyst having a reduced specific surface area. In the catalyst, the dispersibility of the active metals becomes poor because of the too small specific surface area of the catalyst. The catalyst hence has poor desulfurization activity.

Preferred examples of the Group 6 metal contained in the catalyst of the present invention include molybdenum and tungsten. Molybdenum is particularly preferable.

The content of the Group 6 metal is from 10 to 30% by weight, preferably from 16 to 28% by weight, in terms of an oxide amount based on the catalyst.

When the content of the Group 6 metal is lower than 10% by weight, this amount is insufficient for producing the effect attributable to the Group 6 metal. When a catalyst having a Group 6 metal content exceeding 30% by weight is to be produced, aggregation of the Group 6 metal compound occurs in the step of Group 6 metal impregnation (deposition), resulting in poor dispersibility of the Group 6 metal. In addition, this catalyst contains the Group 6 metal in an amount exceeding the limit of efficient dispersion or has a considerably reduced surface area. No improvement in catalytic activity is hence attained.

Preferred examples of the Group 8 metal include cobalt and nickel.

The content of the Group 8 metal is from 1 to 15% by weight, preferably from 3 to 8% by weight, in terms of an oxide amount based on the catalyst.

When the content of the Group 8 metal is lower than 1% by weight, active sites attributable to the Group 8 metal cannot be sufficiently obtained. When a catalyst having a Group 8 metal content exceeding 15% by weight is produced, aggregation of the Group 8 metal compound occurs in the step of Group 8 metal impregnation (deposition), resulting in poor dispersibility of the Group 8 metal. In addition, it is thought that use of the Group 8 metal in such too large an amount yields, e.g., CoO, NiO, etc., which are precursors for $Co_9S_8$ and $Ni_3S_2$, which are inactive forms of cobalt and nickel, and further yields a cobalt spinel, nickel spinel or the like incorporated in support lattices. Namely, the catalytic activity is reduced rather than improved.

The optimal proportion of the Group 8 metal to the Group 6 metal, which are contained in the respective amounts shown above, is such that the ratio of the weight of the Group 8 metal to the total weight of the Group 8 metal and the Group 6 metal in terms of an oxide amount is preferably about from 0.1 to 0.25.

When that ratio is below about 0.1, the formation of a CoMoS phase, NiMoS phase or the like, which are thought to be active sites for desulfurization, is inhibited, resulting in a limited improvement in desulfurization activity. When that ratio is higher than about 0.25, the formation of the aforementioned inactive form of cobalt or nickel ($Co_9S_8$ or $Ni_3S_2$) tends to be accelerated, resulting in a limited improvement in catalytic activity.

The content of phosphorus is from 0.8 to 8% by weight, preferably from 1.5 to 6% by weight, more preferably from 2 to 5% by weight, based on the catalyst.

When the content of phosphorus is lower than 0.8% by weight, it is presumed that the Group 6 metal cannot form a heteropolyacid on the catalyst surface and, hence, the step of presulfiding does not yield highly dispersed $MoS_2$ and cannot sufficiently form the aforementioned active sites for desulfurization. In particular, from the standpoint of enabling the catalyst to have laminating layers of molybdenum disulfide in a number of from 2.5 to 5 on the average after presulfiding, the content of phosphorus is preferably regulated to 1.5% by weight or higher.

On the other hand, when the content of phosphorus is higher than 8% by weight, the Group 6 metal sufficiently forms a heteropolyacid on the catalyst surface and, hence, the high-quality active sites for desulfurization are formed through presulfiding. It is, however, presumed that the excess phosphorus is a major cause of a decrease in activity because it functions as a poison to cover desulfurization-active sites.

The content of carbon is from 2 to 14% by weight, preferably from 2 to 10% by weight, and more preferably from 2 to 4% by weight, based on the catalyst.

The carbon is derived from organic acid, preferably citric acid. When the content of carbon is lower than 2% by weight, the Group 8 metal does not sufficiently form a complex compound with the organic acid on the catalyst surface. In this case, the Group 8 metal which is not in the form of a complex is sulfided prior to the sulfidation of the Group 6 metal in the step of presulfiding. It is presumed that active sites for desulfurization (e.g., a CoMoS phase, NiMoS phase, etc.) are hence not sufficiently formed and that $Co_9S_8$ or $Ni_3S_2$, which are inactive forms of cobalt and nickel, and a cobalt spinel, nickel spinel or the like incorporated in support lattices are yielded.

When the content of carbon is higher than 14% by weight, the Group 8 metal can sufficiently form a complex compound with the organic acid on the catalyst surface. In this case, however, not only the Group 8 metal but also the Group 6 metal form a complex compound with the organic acid, but also the excess carbon derived from the organic acid remains on the catalyst surface.

When the Group 6 metal has formed a complex with the organic acid, the Group 6 metal is sulfided simultaneously with the sulfidation of the Group 8 metal in the activation (sulfidation). It is presumed that in the sulfidation, active sites for desulfurization (e.g., CoMoS phase, NiMoS phase, etc.) are not efficiently formed and this leads to the formation of $Co_9S_8$ or $Ni_3S_2$, which are inactive forms of cobalt and nickel.

Furthermore, the excess carbon is causative of a decrease in activity because it functions as a catalyst poison to cover desulfurization-active sites during sulfidation.

In order for the catalyst of the present invention to have enhanced activity in the hydrodesulfurization and desulfurization of gas oils, it should have the composition described above and further have the following values of a specific surface area, a pore volume and an average pore diameter.

The specific surface area (as determined by the nitrogen adsorption method (BET method)) of the catalyst is about from 220 to 300 $m^2/g$, preferably about from 240 to 280 $m^2/g$.

When the specific surface area of the catalyst is smaller than about 220 $m^2/g$, the Group 6 metal and Group 8 metal, which each are thought to be present in the form of a complex (the Group 6 metal has coordinated to the phosphoric acid to form a heteropolyacid, while the Group 8 metal has coordinated to the organic acid to form an organometallic complex), each are not in a highly dispersed state on the catalyst surface because of the bulkiness of the complex. As a result, it is difficult to precisely regulate the formation of the aforementioned active sites through sulfidation. The catalyst hence has reduced desulfurization activity. When the specific surface area of the catalyst is larger than about 300 $m^2/g$, the pore diameter become remarkably small so that this catalyst has too small a pore diameter and hence has reduced desulfurization activity in hydrotreating because the diffusion of sulfur compounds into the catalyst pores is insufficient.

The pore volume of the catalyst as determined by the mercury penetration method is about from 0.35 to 0.6 ml/g, preferably about from 0.36 to 0.55 ml/g. When the pore volume of the catalyst is smaller than about 0.35 ml/g, the catalyst has insufficient desulfurization activity in hydrotreating because the diffusion of sulfur compounds in the catalyst pores is insufficient. When the pore volume thereof is larger than about 0.6 ml/g, the catalyst has an exceedingly small specific surface area and the active metals are present in an insufficiently dispersed state. This catalyst hence has reduced desulfurization activity.

The average pore diameter of the catalyst, as determined from a pore size distribution obtained by the mercury penetration method, is about from 65 to 95 Å, preferably about from 70 to 95 Å. When the average pore diameter of the catalyst is smaller than about 65 Å, reactants are less apt to diffuse into the pores and, hence, desulfurization reactions do not proceed efficiently. When the average pore diameter thereof is larger than about 95 Å, the catalyst has a reduced internal-surface area of the pores although diffusion into the pores is satisfactory. The catalyst hence has a reduced effective specific surface area and reduced activity.

In order to enable the catalyst to have a larger effective number of pores satisfying the pore requirements described above, the catalyst is regulated so as to have such a pore diameter distribution that the proportion of pores having a diameter which is within about ±15 Å based on the average pore diameter is generally about 75% or higher, preferably about 80% or higher.

In addition, the pore diameter distribution of the catalyst is preferably monomodal. A catalyst having a pore diameter distribution which is not narrow has a larger amount of pores not contributing to activity and hence has reduced desulfurization activity.

The catalyst of the present invention is preferably one which after a sulfidation treatment has laminating layers of molybdenum disulfide, the number of the layers observed through a transmission electron microscope being from 2.5 to 5 on the average.

These layers of molybdenum disulfide, which are formed on the inorganic oxide support, not only serve to increase the contact area of the catalyst but also have active sites, e.g., a CoMoS phase or NiMoS phase, formed therein. However, catalysts in which the number of such laminating layers is smaller than 2.5 on the average have a larger proportion of lowly active Type I sites of a CoMoS phase or NiMoS phase and, hence, do not have high activity. On the other hand, catalysts in which the number of the molybdenum disulfide laminated layers is larger than 5 have a reduced absolute number of active sites although highly active Type II sites of a CoMoS phase or NiMoS phase are formed. Consequently, these catalysts also do not have high activity.

Furthermore, the catalyst of the present invention preferably has an in-plane-direction length of the molybdenum disulfide layers, observed through a transmission electron microscope, which is from 1 to 3.5 nm, preferably from 2 to 3 nm, on the average.

Thus, when the metal selected from metals of Group 6 of the Periodic Table is present at from 10 to 30% by weight, and the metal is molybdenum, the molybdenum forms molybdenum disulfide layers which when observed through a transmission electron microscope after presulfiding have an average-in-plane direction length of 1 to 3.5 nm.

When the in-plane-direction length of the molybdenum disulfide layers is smaller than 1 nm, the cobalt and nickel cannot form a square pyramid type pentacoordinate sulfur structure because the molybdenum disulfide molecules are present only as single molecules. Consequently, a CoMoS phase or NiMoS phase serving as active sites cannot be formed. When the in-plane-direction length thereof is larger than 3.5 nm, the absolute number of edges is reduced because of the large molybdenum disulfide crystals even when the number of the laminating layers is from 2.5 to 5 on the average. As a result, active sites of a CoMoS phase or NiMoS phase cannot be secured in a sufficient number.

The catalyst of the present invention, which has the properties described above, is preferably obtained by the process of the present invention which will be explained below.

Namely, the catalyst is preferably obtained by a process which comprises providing at least one of the aforementioned Group 6 metals, at least one of the aforementioned Group 8 metals, phosphorus, and carbon in the respective amounts shown hereinabove onto an inorganic oxide support having the properties described above, using a solution containing at least one compound containing the Group 6 metal, at least one compound containing the Group 8 metal, organic acid and phosphoric acid, followed by drying. For example, the process is accomplished by impregnating the inorganic oxide support with a solution containing the compounds and the like, followed by drying.

Examples of the compound containing a Group 6 metal in the impregnating solution include molybdenum trioxide, molybdophosphoric acid, ammonium molybdate, molybdic acid and the like. Molybdenum trioxide and molybdophosphoric acid are preferred.

Such compounds are added to the impregnating solution in such an amount that the catalyst contains the Group 6 metal in an amount within the range shown hereinabove.

Examples of the compound containing a Group 8 metal include cobalt carbonate, nickel carbonate, cobalt citrate compounds, nickel citrate compounds, cobalt nitrate hexahydrate, nickel nitrate hexahydrate and the like. Cobalt carbonate, nickel carbonate, cobalt citrate compounds and nickel citrate compounds are preferred. Cobalt citrate compounds and nickel citrate compounds which have a lower decomposition rate than cobalt carbonate and nickel carbonate are particularly preferred.

When a cobalt or nickel compound having a high decomposition rate is used, the cobalt or nickel forms a layer separately from layers of molybdenum disulfide, resulting in insufficient formation of a highly active CoMoS phase or NiMoS phase. In contrast, when a cobalt or nickel compound having a low decomposition rate is used, such a highly active phase can be sufficiently formed at rim-edge parts of the molybdenum disulfide.

Examples of the cobalt citrate compounds include cobaltous citrate ($Co_3(C_6H_5O_7)_2$), cobalt hydrogen citrate ($CoHC_6H_5O_7$), cobalt citrate oxysalt ($Co_3(C_6H_5O_7)_2 \cdot CoO$) and the like. Examples of the nickel citrate compounds include nickelous citrate ($Ni_3(C_6H_5O_7)_2$), nickel hydrogen citrate ($NiHC_6H_5O_7$), nickel citrate oxysalt ($Ni_3(C_6H_5O_7)_2 \cdot NiO$) and the like.

The citric acid compounds of cobalt and nickel can be produced in the following manner. In the case of cobalt, for example, the compounds are obtained by dissolving cobalt carbonate in an aqueous solution of citric acid. A citric acid compound obtained by such a method may be used as it is in catalyst preparation without removing the water therefrom.

The Group 8 metal compounds are added to the impregnating solution in such an amount that the resulting catalyst contains the Group 8 metal in an amount within the range shown hereinabove.

Examples of the organic acid include citric acid monohydrate, citric anhydride, isocitric acid, malic acid, tartaric acid, oxalic acid, succinic acid, glutaric acid, adipic acid, benzoic acid, phthalic acid, isophthalic acid, salicylic acid, malonic acid and the like. Citric acid monohydrate is preferable. It is important that the organic acids should contain substantially no sulfur.

When citric acid is used as the organic acid, the citric acid may be in the form of citric acid alone or may be in the form of a citric acid compound with cobalt or nickel (Group 8 metal), such as those enumerated above.

It is important that the organic acid should be added in such an amount that the resulting catalyst contains residual carbon in an amount within the range shown above. It is advantageous that the addition amount of the organic acid relative to the Group 8 metal is such that the organic acid/Group 8 metal molar ratio is generally from 0.2 to 1.2, preferably from 0.6 to 1.0. When this molar ratio is below 0.2, there are cases where active sites attributable to the Group 8 metal cannot be sufficiently obtained. When that ratio exceeds 1.2, the impregnating solution has too high a viscosity and this not only necessitates a longer time period for the impregnation step but also may result in a poorly dispersed state of the active metals, for example, because the active metals do not infiltrate into inner parts of the support pellets. It is also advantageous that the addition amount of the organic acid relative to the total of the Group 6 metal and the Group 8 metal is such that the organic acid/[(Group 6 metal)+(Group 8 metal)] molar ratio is generally 0.35 or lower, preferably 0.28 or lower, more preferably 0.26 or lower. Values of that molar ratio exceeding 0.35 are undesirable in that the excess organic acid which has not formed a complex with a metal remains on the catalyst surface and this organic acid remaining on the catalyst surface may flow out together with a feedstock oil in a sulfidation step.

Examples of the phosphoric acid include various phosphoric acids such as orthophosphoric acid, metaphosphoric acid, pyrophosphoric acid, triphosphoric acid, tetraphosphoric acid, polyphosphoric acid and the like. Orthophosphoric acid is particularly preferable.

As the phosphoric acid may be used molybdophosphoric acid, which is a compound with a Group 6 metal. In this case, when the phosphorus content in the resulting catalyst is lower than the lower limit shown hereinabove, phosphoric acid is further added.

When the compound of a Group 6 metal or the compound of a Group 8 metal does not sufficiently dissolve in the impregnating solution, an acid may be used, such as nitric acid, organic acid (e.g., citric acid, malic acid, tartaric acid, etc.)), together with that compound. organic acid is preferably used. When organic acid is used, there are cases where carbon derived from the acid remains in the catalyst obtained. It is therefore important to regulate the composition of the impregnating solution so that the carbon content of the catalyst is within the range shown above.

The solvent for dissolving the components in preparing the impregnating solution is water.

When the amount of the solvent used is too small, the support cannot be sufficiently impregnated. When the solvent amount is too large, a considerable proportion of the active metals dissolved remains adherent to the rim and other parts of the container for the impregnating solution without infiltrating into the support, so that the desired impregnation amount cannot be obtained. Consequently, the amount of the solvent is generally from 50 to 90 g, preferably from 60 to 85 g, per 100 g of the support.

In dissolving each component in the solvent to prepare an impregnating solution, the solvent may have a temperature higher than 0° C. and 100° C. or less. So long as the solvent temperature is within this range, each component can be satisfactorily dissolved in the solvent.

The pH of the impregnating solution is preferably lower than 5. When the pH thereof is 5 or higher, the amount of hydroxyl ions is increased and coordination between the organic acid and the Group 8 metal is weakened and thus formation of a complex of the Group 8 metal is inhibited. As a result, the number of desulfurization-active sites (CoMoS phase or NiMoS phase) cannot be greatly increased.

The inorganic oxide support is impregnated with the impregnating solution thus prepared to thereby deposit the solute components contained in the solution on the inorganic oxide support.

The impregnation may be conducted under various conditions. However, in general, the impregnation temperature is preferably higher than 0° C. and lower than 100° C., more preferably from 10 to 50° C., and most preferably from 15 to 30° C. The impregnation period is preferably from 15 minutes to 3 hours, more preferably from 20 minutes to 2 hours, and most preferably from 30 minutes to 1 hour.

When the impregnation temperature is too high, drying may occur during the impregnation, resulting in unevenness of the degree of dispersion.

It is preferred to stir the mixture during the impregnation.

After the solution impregnation, the water contained in the impregnated support is removed to some degree (to LOI (loss on ignition) of about 50% or lower) at a temperature of from room temperature to about 80° C. in a nitrogen or air stream or in vacuo. Thereafter, drying is conducted in an air or nitrogen stream or under vacuum at a temperature of 200° C. or lower. Preferably, the drying is conducted at a temperature of about from 80 to 200° C. for a period of about from 10 minutes to 24 hours. More preferably, the drying is conducted at about from 100 to 150° C. for about from 5 to 20 hours.

When the drying is conducted at a temperature higher than 200° C., the organic acid, which is thought to be in the form of a complex with a metal, is released from the catalyst surface. It is presumed that due to the release of the organic acid, it is difficult to precisely regulate the formation of the active sites (e.g., CoMoS phase, NiMoS phase, etc.) in the resulting catalyst through sulfidation, and that the sulfidation yields, e.g., $Co_9S_8$, $Ni_3S_2$, etc. which are inactive forms of cobalt and nickel, and results in molybdenum disulfide laminated layers in a number of less than 2.5 on the average. Namely, the catalyst thus obtained has low desulfurization activity.

However, when the drying is conducted in vacuo, the drying is preferably conducted to satisfy the above temperature range in terms of pressure at 760 mmHg. The range of the atmosphere at the drying is 300 to 900 mmHg, preferably 700 to 850 mmHg, more preferably 730 to 800 mmHg, and most preferably at atmospheric pressure. When the pressure at the drying is lower than 300 mmHg, the boiling point becomes high so that the organic acid which is in the form of a complex with a metal is easily released and the organic acid, which is thought to be in the form of a complex with a metal, is released from the catalyst surface. Due to the release of the organic acid, it is difficult to precisely regulate the formation of the active sites (e.g., CoMoS phase, NiMoS phase, etc.) in the resulting catalyst through sulfidation, the sulfidation yields, e.g., $Co_9S_8$, $Ni_3S_2$, etc. which are inactive forms of cobalt and nickel, and the catalyst thus obtained has low desulfurization activity.

The shape of the catalyst in the present invention is not particularly limited, and the catalyst can have any of various shapes ordinarily employed for this kind of catalyst. For example, the catalyst can be of a cylindrical, trilobe, or quadlobe shape. The size of the catalyst is generally such that the diameter is about from 1 to 2 mm and the length is about from 2 to 5 mm.

The mechanical strength of the catalyst, in terms of side crushing strength (SCS), is preferably about 2 lbs/mm or higher. When the SCS of the catalyst is lower than that value, particles of the catalyst packed into a reactor are destroyed to cause a pressure difference within the reactor, making the continuation of hydrotreating operation impossible.

The compacted bulk density (CBD) of the catalyst is preferably about from 0.6 to 1.2 (g/ml).

The state of distribution of the active metals in the catalyst are preferably of the uniform type in which the active metals are evenly distributed in the catalyst.

The hydrotreatment method of the present invention comprises bringing a gas oil fraction containing sulfur components into contact with the catalyst under the conditions of a hydrogen partial pressure of about from 3 to 8 MPa, a temperature of about from 300 to 420° C., and a liquid hourly space velocity of about from 0.3 to 5 hr$^{-1}$ to desulfurize the gas oil fraction and thereby diminish the sulfur compounds contained in the gas oil fraction which include sulfur components difficult to remove.

The product oil obtained by the method of the present invention can have a lower sulfur content and a lower nitrogen content than those obtained by hydrotreating techniques of the related art.

For practicing the hydrotreatment method of the present invention on a commercial scale, use may be made of a reactor having therein a fixed-bed, moving-bed, or fluidized-bed type catalyst layer comprising the catalyst of the present invention. Hydrotreatment is accomplished by introducing a feedstock oil into this reactor and reacting it under the conditions described above.

In the most common mode, a fixed-bed catalyst layer is disposed in a reactor and a feedstock oil is introduced into an upper part of the reactor and passed through the fixed bed from the lower to the upper side thereof. The product oil is discharged from an upper part of the reactor.

The method of the present invention may be a single-stage hydrotreatment method in which a feedstock oil is treated in a single reactor packed with the catalyst of the present invention, or may be a multistage successive hydrotreatment method in which several reactors packed with the catalyst are used to treat feedstock oil.

Before being used (i.e., prior to the hydrotreatment method of the present invention), the catalyst of the present invention is activated by sulfidation in the reactor. The sulfidation treatment is conducted with a sulfur compound-containing petroleum distillate and, added thereto, a sulfiding agent, such as dimethyl disulfide, carbon disulfide or the like, or with hydrogen sulfide in a hydrogen atmosphere having a temperature of generally about from 200 to 400° C., preferably about from 250 to 350° C., and a hydrogen partial pressure of ordinary pressure or higher.

Through the sulfidation treatment, the catalyst of the present invention forms laminating layers of molybdenum disulfide having an average laminating layer number of from 2.5 to 5 and an average in-plane-direction length of from 1 to 3.5 nm. The catalyst has highly active sites of a CoMoS phase or NiMoS phase formed in rim-edge parts of the molybdenum disulfide.

EXAMPLE 1

Silica was kneaded together with alumina hydrate, and the resulting mixture was extrusion-molded and then calcined at 600° C. for 2 hours to obtain a silica-alumina composite support in the form of cylindrical moldings having a diameter of 1/16 inch (silica/alumina weight ratio, 1/99; pore volume, 0.70 ml/g; specific surface area, 359 m$^2$/g; average pore diameter, 70 Å).

To 20.3 g of ion-exchanged water, 7.48 g of cobaltous citrate and 1.17 g of phosphoric acid (85% aqueous solution) were added, followed by heating up to 80° C. and stirring for 10 minutes. Subsequently, 11.41 g of molybdophosphoric acid was added thereto and dissolved, followed by stirring at the same temperature for 15 minutes to prepare a solution for impregnation. This impregnating solution had a pH of 0.52.

Into an eggplant type flask, 30.0 g of the silica-alumina composite support was introduced. The whole impregnating solution was added thereto with a pipet. The support was immersed in the solution at about 25° C. for 3 hours.

Thereafter, the support was allowed to dry in a nitrogen stream and then dried in a muffle furnace and in an air stream at atmospheric pressure and at 120° C. for about 16 hours to obtain Catalyst A.

EXAMPLE 2

A powder of zeolite SHY having an SiO$_2$/Al$_2$O$_3$ molar ratio of 6 (average particle diameter, 3.5 μm; 87% of all zeolite particles was accounted for by ones having a particle diameter of 6 μm or smaller) was kneaded together with alumina hydrate. The resulting mixture was extrusion-molded and then calcined at 600° C. for 2 hours to obtain a zeolite-alumina composite support in the form of cylindrical moldings having a diameter of 1/16 inch (zeolite/alumina weight ratio, 7/93; pore volume, 0.69 ml/g; specific surface area, 374 m$^2$/g; average pore diameter, 67 Å).

To 20.3 g of ion-exchanged water, 7.48 g of cobaltous citrate and 1.17 g of phosphoric acid (85% aqueous solution) were added, followed by heating up to 80° C. and stirring for 10 minutes. Subsequently, 11.41 g of molybdophosphoric acid was added thereto and dissolved, followed by stirring at the same temperature for 15 minutes to prepare a solution for impregnation. This impregnating solution had a pH of 0.52.

Into an eggplant type flask, 30.0 g of the zeolite-alumina composite support was introduced. The whole impregnating solution was added thereto with a pipet. The support was immersed in the solution at about 25° C. for 3 hours.

Thereafter, the support was allowed to dry in a nitrogen stream and then dried in a muffle furnace and in an air stream at atmospheric pressure and at 120° C. for about 16 hours to obtain Catalyst B.

EXAMPLE 3

To 20.2 g of ion-exchanged water, 7.91 g of cobaltous citrate and 1.12 g of phosphoric acid (85% aqueous solution) were added, followed by heating up to 80° C. and stirring for 10 minutes. Subsequently, 14.50 g of molybdophosphoric acid was added thereto and dissolved, followed by stirring at the same temperature for 15 minutes to prepare a solution for impregnation. This impregnating solution had a pH of 0.54.

Into an eggplant type flask, 30.0 g of a zeolite-alumina composite support which was the same as in Example 2 was introduced. The whole impregnating solution was added thereto with a pipet. The support was immersed in the solution at about 25° C. for 3 hours.

Thereafter, the support was allowed to dry in a nitrogen stream and then dried in a muffle furnace and in an air stream at atmospheric pressure and at 120° C. for about 16 hours to obtain Catalyst C.

EXAMPLE 4

To 22.2 g of ion-exchanged water, 3.40 g of cobalt carbonate, 4.00 g of citric acid monohydrate and 1.46 g of phosphoric acid (85% aqueous solution) were added, followed by heating up to 80° C. and stirring for 10 minutes. Subsequently, 12.91 g of molybdophosphoric acid was added thereto and dissolved, followed by stirring at the same temperature for 30 minutes to prepare a solution for impregnation. This impregnating solution had a pH of 0.53.

Into an eggplant type flask, 30.0 g of a zeolite-alumina composite support which was the same as in Example 2 was introduced. The whole impregnating solution was add thereto with a pipet. The support was immersed in the solution at about 25° C. for 3 hours.

Thereafter, the support was allowed to dry in a nitrogen stream and then dried in a muffle furnace and in an air stream at atmospheric pressure and at 120° C. for about 16 hours to obtain Catalyst D.

EXAMPLE 5

To 21.6 g of ion-exchanged water, 3.40 g of cobalt carbonate, 4.01 g of citric acid monohydrate, 9.43 g of molybdenum trioxide and 2.09 g of phosphoric acid (85% aqueous solution) were added, followed by heating up to 80° C. and stirring for 30 minutes to prepare a solution for impregnation. This impregnating solution had a pH of 0.54.

Into an eggplant type flask, 30.0 g of a zeolite-alumina composite support which was the same as in Example 2 was introduced. The whole impregnating solution was added thereto with a pipet. The support was immersed in the solution at about 25° C. for 3 hours.

Thereafter, the support was allowed to dry in a nitrogen stream and then dried in a muffle furnace and in an air stream at atmospheric pressure and at 120° C. for about 16 hours to obtain Catalyst E.

EXAMPLE 6

To 20.0 g of ion-exchanged water were added 7.80 g of cobaltous citrate and 2.19 g of phosphoric acid (85% aqueous solution), followed by heating up to 80° C. and stirring for 10 minutes. Subsequently, 13.10 g of molybdophosphoric acid was added thereto and dissolved, followed by stirring at the same temperature for 15 minutes to prepare a solution for impregnation. This impregnating solution had a pH of 0.51.

Into an eggplant type flask, 30.0 g of a zeolite-alumina composite support which was the same as in Example 2 was introduced. The whole impregnating solution was added thereto with a pipet. The support was immersed in the solution at about 25° C. for 3 hours.

Thereafter, the support was allowed to dry in a nitrogen stream and then dried in a muffle furnace and in an air stream at atmospheric pressure and at 120° C. for about 16 hours to obtain Catalyst F.

EXAMPLE 7

To 19.8 g of ion-exchanged water, 7.92 g of cobaltous citrate and 3.68 g of phosphoric acid (85% aqueous solution) were added, followed by heating up to 80° C. and stirring for 10 minutes. Subsequently, 12.08 g of molybdophosphoric acid was added thereto and dissolved, followed by stirring at the same temperature for 15 minutes to prepare a solution for impregnation. This impregnating solution had a pH of 0.48.

Into an eggplant type flask, 30.0 g of a zeolite-alumina composite support which was the same as in Example 2 was introduced. The whole impregnating solution was added thereto with a pipet. The support was immersed in the solution at about 25° C. for 3 hours.

Thereafter, the support was allowed to dry in a nitrogen stream and then dried in a muffle furnace and in an air stream at atmospheric pressure and at 120° C. for about 16 hours to obtain Catalyst G.

EXAMPLE 8

A support was prepared in the same manner as in Example 1, except that an aqueous solution containing boric acid was used in place of the silica. Thus, a boria-alumina composite support in the form of cylindrical moldings having a diameter of 1/16 inch was obtained (boria/alumina weight ratio, 2/98; pore volume, 0.71 ml/g; specific surface area, 363 $m^2$/g; average pore diameter, 72 Å).

To this composite support, the whole of an impregnating solution which was the same as in Example 1 was added with a pipet. The support was immersed in the solution at about 25° C. for 3 hours.

Thereafter, the support was allowed to dry in a nitrogen stream and then dried in a muffle furnace and in an air stream at atmospheric pressure and at 120° C. for about 16 hours to obtain Catalyst H.

EXAMPLE 9

A powder of zeolite SHY having an $SiO_2/Al_2O_3$ molar ratio of 6 (average particle diameter, 3.5 μm; 87% of all zeolite particles was accounted for by ones having a particle diameter of 6 μm or smaller) was kneaded together with alumina hydrate. The resulting mixture was extrusion-molded and then calcined at 600° C. for 2 hours to obtain a zeolite-alumina composite support in the form of cylindrical moldings having a diameter of 1/16 inch (zeolite/alumina weight ratio, 5/95; pore volume, 0.81 ml/g; specific surface area, 383 $m^2$/g; average pore diameter, 81 Å).

To 23.5 g of ion-exchanged water, 10.26 g of cobaltous citrate and 2.24 g of phosphoric acid (85% aqueous solution) were added, followed by heating up to 80° C. and stirring for 10 minutes. Subsequently, 17.61 g of molybdophosphoric acid was added thereto and dissolved, followed by stirring at the same temperature for 15 minutes to prepare a solution for impregnation. This impregnating solution had a pH of 0.51.

Into an eggplant type flask, 30.0 g of the zeolite-alumina composite support was introduced. The whole impregnating solution was added thereto with a pipet. The support was immersed in the solution at about 25° C. for 3 hours.

Thereafter, the support was allowed to dry in a nitrogen stream and then dried in a muffle furnace and in an air stream at atmospheric pressure and at 120° C. for about 16 hours to obtain Catalyst I.

COMPARATIVE EXAMPLE 1

In 21.6 g of ion-exchanged water, 3.31 g of cobalt carbonate, 11.41 g of molybdophosphoric acid and 1.17 g of orthophosphoric acid were dissolved. Thus, a solution for impregnation was prepared.

Into an eggplant type flask, 30.0 g of a γ-alumina support (pore volume, 0.69 ml/g; specific surface area, 364 $m^2$/g; average pore diameter, 64 Å) was introduced. The whole impregnating solution was added thereto with a pipet. The support was immersed in the solution at about 25° C. for 1 hour.

Thereafter, the support was allowed to dry in a nitrogen stream, subsequently dried in a muffle furnace and in an air stream at atmospheric pressure and at 120° C. for about 1 hour, and then calcined at 500° C. for 4 hours to obtain Catalyst a.

COMPARATIVE EXAMPLE 2

To 20.2 g of ion-exchanged water, 7.45 g of cobaltous citrate and 1.17 g of phosphoric acid (85% aqueous solution) were added, followed by heating up to 80° C. and stirring for 10 minutes. Subsequently, 11.41 g of molybdophosphoric acid was added thereto and dissolved, followed by stirring at the same temperature for 15 minutes to prepare a solution for impregnation.

Into an eggplant type flask, 30.0 g of a zeolite-alumina composite support which was the same as in Example 2 was introduced. The whole impregnating solution was added thereto with a pipet. The support was immersed in the solution at about 25° C. for 3 hours.

Thereafter, the support was allowed to dry in a nitrogen stream, subsequently dried in a muffle furnace and in an air stream at atmospheric pressure and at 120° C. for about 1 hour, and then calcined at 500° C. for 4 hours to obtain Catalyst b.

COMPARATIVE EXAMPLE 3

To 30.0 g of ion-exchanged water, 2.61 g of cobalt carbonate, 6.14 g of citric acid monohydrate, 6.41 g of molybdenum trioxide and 2.77 g of phosphoric acid (85% aqueous solution) were added thereto, followed by heating up to 80° C. and stirring for 30 minutes to prepare a solution for impregnation. This impregnating solution had a pH of 0.82.

Into an eggplant type flask, 30.0 g of a γ-alumina support (pore volume, 0.61 ml/g; specific-surface area, 240 m$^2$/g; average pore diameter, 72 Å) was introduced. The whole impregnating solution was added thereto with a pipet. The support was immersed in the solution at about 25° C. for 1 hour. At that time, the excess impregnating solution remained in the eggplant type flask without infiltrating into pores of the support.

Thereafter, the support was allowed to dry in a nitrogen stream and then dried in a muffle furnace and in an air stream at atmospheric pressure and at 120° C. for about 16 hours to obtain Catalyst c.

COMPARATIVE EXAMPLE 4

To 19.3 g of ion-exchanged water, 8.28 g of cobaltous citrate and 5.76 g of phosphoric acid (85% aqueous solution) were added, followed by heating up to 80° C. and stirring for 10 minutes. Subsequently, 12.64 g of molybdophosphoric acid was added thereto and dissolved, followed by stirring at the same temperature for 15 minutes to prepare a solution for impregnation. This impregnating solution had a pH of 0.46.

Into an eggplant type flask, 30.0 g of a zeolite-alumina composite support which was the same as in Example 2 was introduced. The whole impregnating solution was added thereto with a pipet. The support was immersed in the solution at about 25° C. for 3 hours.

Thereafter, the support was allowed to dry in a nitrogen stream and then dried in a muffle furnace and in an air stream at atmospheric pressure and at 120° C. for about 16 hours to obtain Catalyst d.

COMPARATIVE EXAMPLE 5

To 22.6 g of ion-exchanged water, 3.31 g of cobalt carbonate and 1.17 g of phosphoric acid (85% aqueous solution) were added, followed by heating up to 80° C. and stirring for 10 minutes. Subsequently, 11.41 g of molybdophosphoric acid was added thereto and dissolved, followed by stirring at the same temperature for 15 minutes to prepare a solution for impregnation. This impregnating solution had a pH of 0.54.

Into an eggplant type flask, 30.0 g of a same zeolite-alumina composite support which was the same as in Example 2 was introduced. The whole impregnating solution was added thereto with a pipet. The support was immersed in the solution at about 25° C. for 3 hours.

Thereafter, the support was allowed to dry in a nitrogen stream and then dried in a muffle furnace and in an air stream at atmospheric pressure and at 120° C. for about 16 hours to obtain Catalyst e.

COMPARATIVE EXAMPLE 6

To 20.5 g of ion-exchanged water, 7.27 g of cobaltous citrate was added, followed by heating up to 80° C. and stirring for 10 minutes. Subsequently, 11.10 g of molybdophosphoric acid was added thereto and dissolved, followed by stirring at the same temperature for 15 minutes to prepare a solution for impregnation. This impregnating solution had a pH of 0.78.

Into an eggplant type flask, 30.0 g of a zeolite-alumina composite support which was the same as in Example 2 was introduced. The whole impregnating solution was added thereto with a pipet. The support was immersed in the solution at about 25° C. for 3 hours.

Thereafter, the support was allowed to dry in a nitrogen stream and then dried in a muffle furnace and in an air stream at atmospheric pressure and at 120° C. for about 16 hours to obtain Catalyst f.

The catalysts obtained in Examples and Comparative Examples described above were subjected to elemental analysis and property examinations. The found values obtained are shown in Table 1.

The methods and analytical instruments used for the catalyst analyses are shown below.

1. Analysis for Physical Properties

Specific surface area was measured by the BET method, which is based on nitrogen adsorption.

As a nitrogen adsorption apparatus was used a surface area-measuring apparatus (Belsorp 28) manufactured by Bell Japan Corp.).

Pore volume, average pore diameter, and pore size distribution were determined by the mercury penetration method.

As an apparatus for mercury penetration was used a porosimeter (MICROMERITICS AUTO-PORE 9200; manufactured by Shimadzu Corp.).

Measurement was made after the sample was heated at 400° C. for 1 hour under vacuum to remove volatiles therefrom.

The number of molybdenum disulfide laminating layers was determined with a transmission electron microscope (TEM) (trade name "JEM-2010" manufactured by JEOL Ltd.) in the following manner.

1) A catalyst was packed into a flow-through type reaction tube. The catalyst packed was held at room temperature in a nitrogen stream for 5 minutes, and the surrounding gas was replaced with a mixture of H$_2$S (5 vol %) and H$_2$. The catalyst was heated at a rate of 5° C./min. After the catalyst temperature reached 400° C., the catalyst was held for 1 hour and then cooled to 200° C. in that atmosphere. Subsequently, the surrounding gas was replaced with nitrogen and the catalyst was cooled to room temperature to complete sulfidation.
2) The catalyst thus sulfided was pulverized with an agate mortar.
3) A small portion of the catalyst pulverized was dispersed in acetone.

4) The resulting suspension was dropped onto a microgrid and dried at room temperature to obtain a sample.
5) The sample was set on the examination part of the TEM and examined at an accelerating voltage of 200 kV. The direct magnification was 200,000 diameters, and five fields of view were examined.
6) Each photograph was enlarged so as to result in a magnification of 2,000,000 diameters (size: 16.8 cm×16.8 cm). The number of the molybdenum disulfide laminated layers visually recognized on the photograph was counted and the in-plane-direction length of the layers was measured.

2. Analysis of Catalyst for Carbon Content

A carbon content was determined with Yanako CHN Corder MT-5 (manufactured by Yanagimoto Seisakusho).
The method of analysis is as follows.
(1) A catalyst is powdered with an agate mortar.
(2) The powdered catalyst (7 mg) is placed on a platinum boat, which is put in a burning oven.
(3) The catalyst is calcined at 950° C.
(4) The combustion gas generated is introduced into a differential thermal-conductivity meter to determine the amount of carbon contained in the catalyst.

Pressure (hydrogen partial pressure): 4.9 MPa
Atmosphere:
   Hydrogen and the feedstock oil (liquid hourly space velocity, 1.5 hr$^{-1}$; hydrogen/oil ratio, 200 m$^3$ (normal)/kl)
Temperature:
   Introduction of hydrogen and the feedstock oil at about 22° C., heating at a rate of 20° C./hr, holding at 300° C. for 24 hr, and subsequent heating to the reaction temperature, i.e., 350° C., at a rate of 20° C./hr Hydrotreating Reaction Conditions:
   Reaction temperature: 350° C.
   Pressure (hydrogen partial pressure): 4.9 MPa
   Liquid hourly space velocity: 1.5 hr$^{-1}$
   Hydrogen/oil ratio: 200 m$^3$ (normal)/kl Properties of Feedstock Oil:
   Kind of oil:
      straight-run gas oil from Middle East crude
   Density (15/4° C.): 0.8609
   Distillation characteristics:

TABLE 1

| | Chemical Composition (wt %) | | | | | Physical properties | | | Molybdenum disulfide | |
|---|---|---|---|---|---|---|---|---|---|---|
| Catalyst | CoO | MoO$_3$ | P$_2$O$_5$ | C | Others (including carrier) | Specific surface area (m$^2$/g) | Pore volume (ml/g) | Average pore diameter (Å) | Average laminating layer number | Averge in-plane-direction length (nm) |
| A | 5.0 | 20.0 | 2.8 | 3.8 | balance | 260 | 0.40 | 74 | 2.9 | 2.9 |
| B | 5.3 | 20.0 | 2.5 | 3.7 | balance | 274 | 0.40 | 73 | 3.2 | |
| C | 5.3 | 24.0 | 2.5 | 3.7 | balance | 266 | 0.38 | 74 | 3.2 | |
| D | 4.6 | 22.3 | 2.5 | 2.1 | balance | 255 | 0.40 | 76 | 3.1 | 2.8 |
| E | 4.8 | 21.5 | 2.5 | 2.1 | balance | 267 | 0.40 | 74 | 3.2 | 2.8 |
| F | 5.7 | 22.1 | 3.9 | 3.4 | balance | 264 | 0.35 | 73 | 3.1 | 2.9 |
| G | 5.5 | 18.9 | 5.4 | 3.4 | balance | 246 | 0.33 | 71 | 3.1 | |
| H | 5.1 | 20.3 | 2.7 | 3.8 | balance | 261 | 0.41 | 75 | 3.1 | |
| I | 6.0 | 25.1 | 3.8 | 3.9 | balance | 251 | 0.37 | 91 | 3.3 | 2.9 |
| a | 5.0 | 20.0 | 2.7 | 0 | balance | 250 | 0.48 | 75 | 1.9 | 3.6 |
| b | 5.4 | 21.0 | 2.5 | 0 | balance | 255 | 0.44 | 84 | 2.2 | 3.5 |
| c | 3.8 | 15.1 | 4.7 | 4.9 | balance | 165 | 0.32 | 79 | | |
| d | 5.1 | 19.0 | 7.6 | 3.5 | balance | 221 | 0.30 | 70 | 3.1 | 2.9 |
| e | 5.0 | 20.5 | 2.4 | 0 | balance | 244 | 0.41 | 82 | 2.7 | |
| f | 5.3 | 21.0 | 0.9 | 3.2 | balance | 268 | 0.42 | 72 | 1.9 | |

Hydrotreating Reaction of Straight-run Gas Oil:

Using catalysts A to I and a to f prepared in the Examples and Comparative Examples given above, a straight-run gas oil having the properties shown below was hydrotreated according to the following procedure.

First, the catalyst was packed into a high-pressure flow-through type reactor to form a fixed-bed catalyst layer. This catalyst was pretreated under the following conditions.

Subsequently, a fluid mixture which consisted of the feedstock oil and a hydrogen-containing gas and had been heated to the reaction temperature was introduced through an upper part of the reactor to allow a hydrotreating reaction to proceed under the following conditions. A fluid mixture of a product oil and gases was discharged through a lower part of the reactor, and the product oil was separated with a gas/liquid separator.

Sulfidation of Catalyst:

Each catalyst was subjected to liquid sulfidation with the feedstock oil.

Initial distillation point of 211.5° C., 50% point of 314.0° C., 90% point of 365.0° C., end point of 383.5° C.
Sulfur content: 1.37 wt %
Nitrogen content: 210 wt ppm
Dynamic viscosity (@ 30° C.): 6.570 cSt
Pour point: 5.0° C.
Cloud point: 6.0° C.
Cetane index: 54.5
Saybolt color: −11

The results of the reaction were analyzed by the following method.

The reactor was operated at 350° C. Six days thereafter, the product oil was sampled and analyzed for properties. The results obtained are shown in Table 4.

1. Degree of Desulfurization (HDS) (%)

The proportion of sulfur compounds which have disappeared from the feedstock oil through conversion to hydrogen sulfide by desulfurization reaction is defined as the degree of desulfurization. The degree of desulfurization was calculated from the analytical values of sulfur content for the feedstock oil and product oil using the following equation.

2. Desulfurization Reaction Rate Constant (Ks):

The rate constant of a rate equation which gives the 1.3rd order of reaction with respect to decrease in the sulfur content of the product oil (Sp) is taken as the desulfurization reaction rate constant (Ks).

Also, the higher the reaction rate constant, the more excellent the catalytic activity.

Degree of desulfurization (%)=[$(Sf-Sp)/Sf$]×100

Desulfurization reaction rate constant=[$1/(Sp)^{1.3-1}-1/(Sf)^{1.3-1}$]×($LHSV$)

wherein Sf: sulfur content in feedstock oil (wt %)
Sp: sulfur content in product oil (wt %)
LHSV: liquid hourly space velocity ($hr^{-1}$)

Specific activity (%)=((each desulfurization reaction rate constant)/(desulfurization reaction rate constant of comparative Catalyst a))×100

TABLE 2

| | Reaction temperature, 350° C. | | | |
|---|---|---|---|---|
| Catalyst | Sulfur scontent (wt ppm) | Rate constant | Specific activity | Nitrogen content (wt ppm) |
| A | 65 | 18.12 | 166 | 13 |
| B | 47 | 20.42 | 187 | 2 |
| C | 48 | 20.20 | 185 | 2 |
| D | 40 | 21.62 | 198 | 1 |
| E | 39 | 21.84 | 200 | 1 |
| F | 44 | 20.92 | 192 | 1 |
| G | 96 | 15.62 | 143 | 2 |
| H | 56 | 19.14 | 175 | 6 |
| I | 18 | 28.75 | 263 | 0 |
| a | 232 | 10.92 | 100 | 53 |
| b | 138 | 13.54 | 124 | 34 |
| c | 262 | 10.36 | 95 | 67 |
| d | 211 | 11.36 | 104 | 3 |
| e | 311 | 9.62 | 88 | 50 |
| f | 166 | 12.56 | 115 | 7 |

As is apparent from Table 2, ultra-deep desulfurization to a sulfur content of 100 weight ppm or below can be easily attained with Catalysts A to I produced by the process of the present invention.

Figure 1:
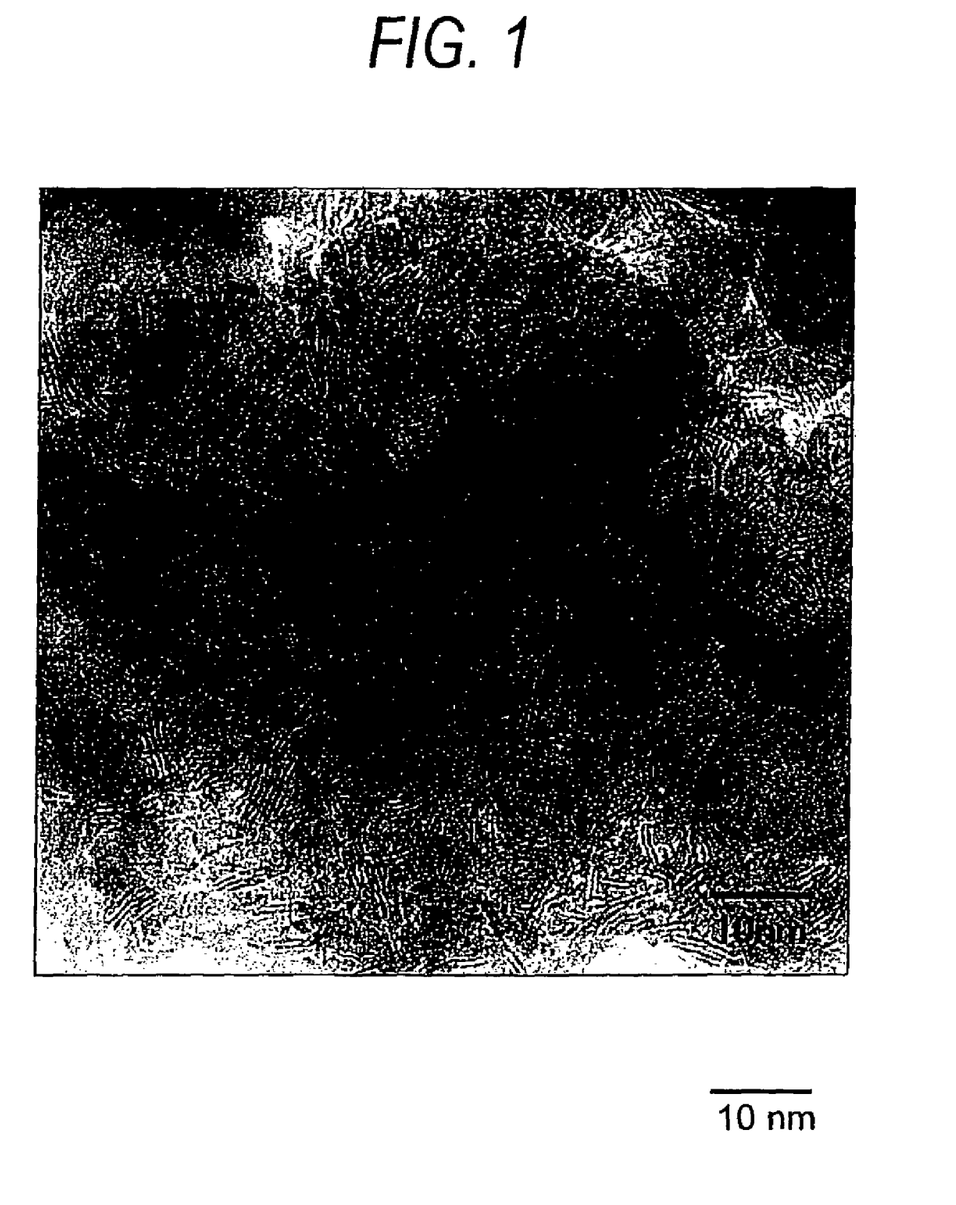
FIG. 1 is a transmission electron photomicrograph of Catalyst B according to the present invention.

FIG. 1 shows a transmission electron micrograph of catalyst B. The black fringes in FIG. 1 indicate layers of molybdenum disulfide.

Hydrotreating Reaction of Vacuum Distillation Gas Oil:

Using Catalysts A and a prepared in Example 1 and Comparative Example 1, respectively, a vacuum distillation gas oil having the properties shown below was hydrotreated according to the following procedure.

First, the catalyst was packed into a high-pressure flow-through type reactor to form a fixed-bed catalyst layer. The catalyst was pretreated under the following conditions.

Subsequently, a fluid mixture which consisted of the feedstock oil and a hydrogen-containing gas and had been heated to the reaction temperature was introduced through an upper part of the reactor to allow hydrotreating reactions including desulfurization reaction and cracking reaction to proceed under the following conditions (The reactor was operated first in the desulfurization mode and then in the mild hydrocracking mode). A fluid mixture of a product oil and gases was discharged through a lower part of the reactor, and the product oil was separated with a gas/liquid separator.

Catalyst Pretreatment Conditions:
Pressure (hydrogen partial pressure): 4.9 MPa
Sulfiding agent:
The feedstock oil used in the "Hydrotreating reaction of straight-run gas oil" described above (straight-run gas oil from Middle East crude)
Temperature:
Stepwise heating consisting of 1.5 hr holding at 290° C. and subsequent 15 hr holding at 320° C. (heating rate, 25° C./hr)

Conditions for Desulfurization Reaction (Desulfurization Operation Mode):
Reaction temperature: 360° C.
Pressure (hydrogen partial pressure): 4.9 MPa
Liquid hourly space velocity: 0.66 $hr^{-1}$
Hydrogen/oil ratio: 560 $m^3$ (normal)/kl Conditions for Cracking Reaction (Mild Cracking Operation Mode):
Reaction temperature: 400° C.
Pressure (hydrogen partial pressure): 4.9 MPa
Liquid hourly space velocity: 0.66 $hr^{-1}$
Hydrogen/oil ratio: 560 $m^3$ (normal)/kl Properties of Feedstock Oil:
Kind of oil:
vacuum distillation gas oil from Arabian Light
Specific gravity (15/4° C.): 0.9185
Distillation characteristics:
Initial distillation point of 349.0° C., 50% point of 449.0° C., 90% point of 529.0° C., end point of 566.0° C.
Sulfur content: 2.45 wt %
Nitrogen content: 0.065 wt %
Pour point: 35° C.
Asphaltene: <100 ppm
Aniline point: 82° C.

Desulfurization activity was measured by the following method.

The reactor was operated at 360° C. At the time when 5 days had passed, the product oil was sampled and analyzed for properties (degree of desulfurization (HDS) (%), desulfurization reaction rate (Ks), and specific activity (%)) in the same manners as in the "Hydrotreating reaction of straight-run gas oil" described above.

Cracking activity was analyzed by the following method.

After completion of the evaluation of desulfurization activity, the reaction temperature was elevated to 400° C. and the reactor was operated at this temperature. At the time when 3 days had passed, the product oil was sampled and analyzed for properties. The results obtained are shown in Table 3.

1. Degree of Cracking (HYC) (%)

The degree of hydrocracking for the catalyst is shown in terms of the proportion of the fractions of 343° C. and lower in all fractions of the product oil which are obtained by gas chromatography distillation in accordance with ASTM D2887. The higher the cracking activity of the catalyst, the higher the proportion of the gas oil fractions of 343° C. or lower.

2. Cracking Reaction Rate Constant (Kc)

The rate constant of a rate equation which gives the first order of reaction with respect to the degree of cracking is taken as the cracking reaction rate constant (Kc).

The higher the reaction rate constant, the more excellent the catalytic activity.

Degree of cracking (%)=[(amount of fractions of 343° C. and lower in product oil)/(amount of all fractions of product oil)]×100

Cracking reaction rate constant=−(LHSV)·ln[(1−(degree of cracking))/100]

Specific activity (%)=[(each cracking reaction rate constant)/(cracking reaction rate constant of comparative catalyst a)]×100

TABLE 3

| Catalyst | A | a |
|---|---|---|
| Product oil sulfur content (wt %) | 0.056 | 0.108 |
| Degree of desulfurization (%) | 97.7 | 95.6 |
| Desulfurization rate constant | 4.74 | 3.18 |
| Desulfurization specific activity (%) | 149 | 100 |
| Degree of cracking (%) | 29.6 | 26.4 |
| Cracking rate constant | 0.232 | 0.202 |
| Specific activity in cracking (%) | 114 | 100 |

Figure 2:
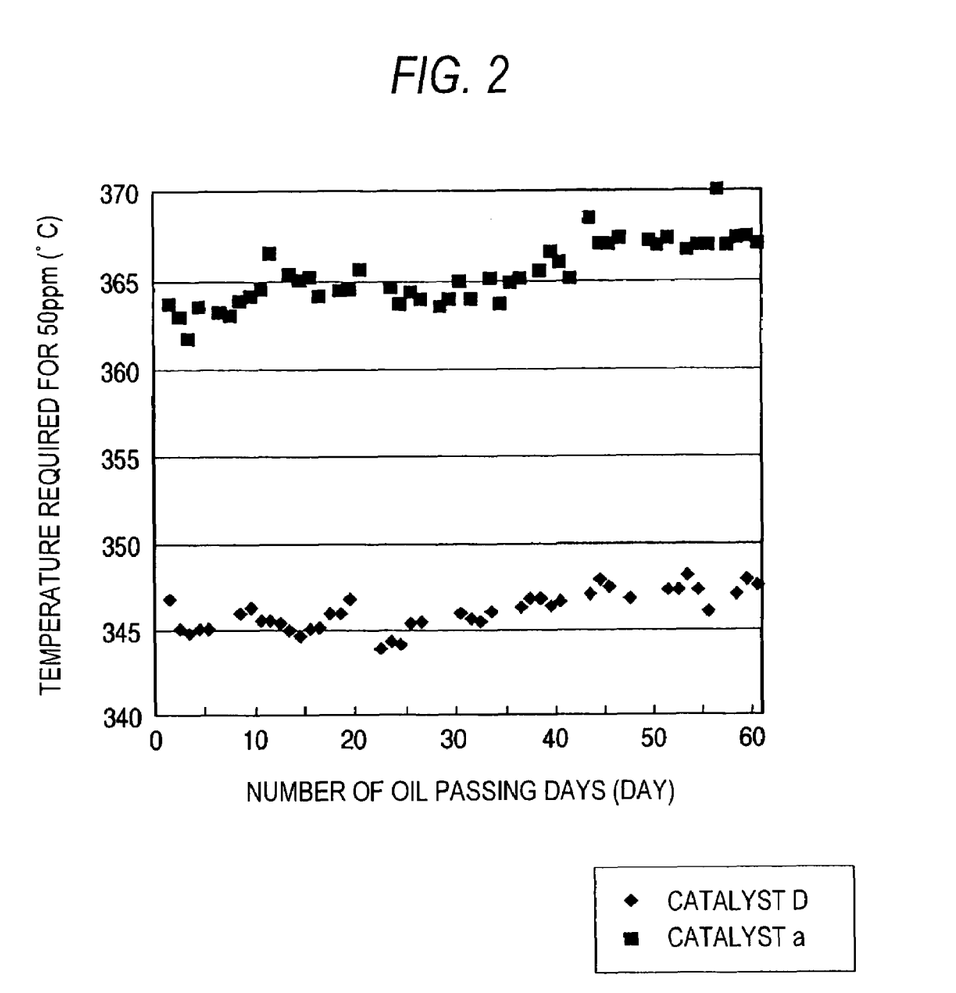

Furthermore, Catalysts D and a were subjected to a catalyst life test under the following reaction conditions. The results obtained are shown in FIG. 2. In FIG. 2, the large solid squares indicate the results for Catalyst D and the large solid lozenges indicate the results for Catalyst a.

Reaction Conditions:
　Reaction temperature:
　　Temperature required for 50 ppm
　Pressure (hydrogen partial pressure): 4.9 MPa
　Liquid hourly space velocity: 1.3 hr$^{-1}$
　Hydrogen/oil ratio: 200 m$^3$ (normal)/kl In FIG. 2, the abscissa indicates the number of oil passing days (days) and the ordinate indicates the temperature (° C.) required for the product oil to have a sulfur concentration of 50 weight ppm. FIG. 2 shows the following. In the reaction using catalyst D according to the present invention, temperatures around 345° C. were sufficient throughout the 2-month oil passing. In contrast, in the case of comparative Catalyst a, a temperature above 360° C. was required already on the first day of oil passing and a temperature as high as above 365° C. came to be required after about 2 months.

As apparent from the results given above, the catalysts according to the present invention had highly excellent activity and an exceedingly long life when used in the desulfurization reaction and denitrification reaction of gas oils in the ultra-deep desulfurization region under almost the same conditions, e.g., hydrogen partial pressure and reaction temperature, as in the case of the gas oil hydrotreating processes heretofore in use.

INDUSTRIAL APPLICABILITY

As described above in detail, according to the present invention, the following effects can be obtained.
(1) The catalyst has high desulfurization and denitrification activity and is hence effective in greatly reducing the sulfur and nitrogen contents in gas oils.
(2) Almost the same reaction conditions as in hydrotreating processes heretofore in use can be employed. Consequently, apparatus heretofore in use can be used without necessitating a considerable modification.
(3) A gas oil base reduced in sulfur content and nitrogen content can be easily supplied.

The invention claimed is:
1. A catalyst for hydrotreating gas oil, which comprises an inorganic oxide support having provided thereon:
　at least one metal selected from metals in the Group 6 of the periodic table at from 10 to 30% by weight,
　at least one metal selected from metals in the Group 8 of the periodic table at from 1 to 15% by weight,
　phosphorus at from 1.5 to 6% by weight,
　each in terms of a respective oxide amount based on the catalyst, and
　an organic acid at from 2 to 14 wt % as an amount of carbon based on the catalyst, and
　wherein the organic acid is contained in an amount of from 0.2 to 1.2 moles relative to 1 mole of the metal of Group 8 of the periodic table, and
　wherein the catalyst has a specific surface area of from 220 to 300 m$^2$/g, a pore volume of from 0.35 to 0.6 ml/g, and an average pore diameter of about from 65 to 95 Å.
2. The catalyst according to claim 1, wherein the at least one metal selected from metals in the Group 6 is molybdenum or tungsten.
3. The catalyst according to claim 1, wherein the at least one metal selected from metals in the Group 6 is molybdenum.
4. The catalyst according to claim 3, wherein molybdenum disulfide layers observed through a transmission electron microscope after presulfiding have an average laminating layer number of 2.5 to 5.
5. The catalyst according to claim 3, wherein molybdenum disulfide layers are present and, when observed through a transmission electron microscope after presulfiding, the molybdenum disulfide layers have an average in-plane-direction length of 1 to 3.5 nm.
6. The catalyst according to claim 1, wherein the at least one metal selected from the Group 8 is cobalt or nickel.
7. A process for producing the catalyst of any one of claims 1 to 6, which comprises providing a metal in the Group 6 of the periodic table at from 10 to 30% of by weight, a metal in the Group 8 of the periodic table at from 1 to 15% by weight, and phosphorus at from 1.5 to 6% by weight, each in terms of a respective oxide amount based on the catalyst, and an organic acid at from 2 to 14 wt % as an amount of carbon based on the catalyst and in such a manner that a molar ratio of organic acid/Group 8 metal of the periodic table is from 0.2 to 1.2 onto an inorganic oxide support having a specific surface area of from 270 to 500 m$^2$/g, a pore volume of from 0.55 to 0.9 ml/g, and an average pore diameter of from 60 to 120 Å, using a solution comprising the metal in the Group 8 of the periodic table, the metal in the Group 6 of the periodic table, the organic acid, and phosphoric acid, followed by drying at a temperature of 200° C. or lower.
8. A method for hydrotreating gas oil, which comprises subjecting a gas oil fraction to a catalytic reaction in the presence of the catalyst of any one of claims 1 to 6 under conditions at a hydrogen partial pressure of about from 3 to 8 MPa, a temperature of from about 300 to 420° C., and a liquid hourly space velocity of from about 0.3 to 5 hr$^{-1}$.
9. The catalyst according to claim 1, wherein the organic acid is contained in an amount of from 0.6 to 1.0 mole relative to 1 mole of the metal of Group 8 of the periodic table.

10. The process of claim 7, wherein the organic acid is contained in an amount of from 0.6 to 1.0 mole relative to 1 mole of the metal of Group 8 of the periodic table.

11. The catalyst according to claim 1, wherein the addition amount of the organic acid relative to the total amount of the Group 6 metal and the Group 8 metal is such that the organic acid/[(Group 6 metal)+(Group 8 metal)] molar ratio is 0.35 or lower.

12. The process according to claim 7, wherein the addition amount of the organic acid relative to the total amount of the Group 6 metal and the Group 8 metal is such that the organic acid/[(Group 6 metal)+(Group 8 metal)] molar ratio is 0.35 or lower.

13. The catalyst according to claim 1, wherein the addition amount of the organic acid relative to the total amount of the Group 6 metal and the Group 8 metal is such that the organic acid/[(Group 6 metal)+(Group 8 metal)] molar ratio is 0.26 or lower.

14. The process according to claim 7, wherein the addition amount of the organic acid relative to the total amount of the Group 6 metal and the Group 8 metal is such that the organic acid/[(Group 6 metal)+(Group 8 metal)] molar ratio is 0.26 or lower.

15. The process of claim 7, wherein the drying is conducted at a temperature of from 80 to 200° C. for a period of about from 10 minutes to 24 hours.

16. The process according to claim 7, wherein the drying is conducted at about from 100 to 150° C. for about from 5 to 20 hours.

* * * * *